United States Patent
Maruyama et al.

(10) Patent No.: US 11,228,499 B1
(45) Date of Patent: Jan. 18, 2022

(54) CONTROL NETWORK PLANNING

(71) Applicant: Hitachi, Ltd., Tokyo (JP)

(72) Inventors: Tatsuya Maruyama, Santa Clara, CA (US); Hidenori Omiya, Ibaraki-ken (JP); Yusaku Otsuka, Ibaraki-ken (JP); Iori Kobayashi, Ibaraki-ken (JP); Toshiki Shimizu, Ibaraki-ken (JP); Noritaka Matsumoto, Ibaraki-ken (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/990,830

(22) Filed: Aug. 11, 2020

(51) Int. Cl.
| | |
|---|---|
| H04L 12/24 | (2006.01) |
| H04L 12/721 | (2013.01) |
| H04L 29/08 | (2006.01) |
| G16Y 40/10 | (2020.01) |
| G16Y 40/30 | (2020.01) |

(52) U.S. Cl.
CPC .............. H04L 41/12 (2013.01); G16Y 40/10 (2020.01); G16Y 40/30 (2020.01); H04L 41/042 (2013.01); H04L 41/0823 (2013.01); H04L 45/566 (2013.01); H04L 67/12 (2013.01)

(58) Field of Classification Search
None
See application file for complete search history.

(56) References Cited

U.S. PATENT DOCUMENTS

| | | | |
|---|---|---|---|
| 8,325,627 B2 * | 12/2012 | Pratt, Jr. .......... | H04W 72/0446 370/255 |
| 10,038,700 B1 * | 7/2018 | Duchin ................. | H04L 63/102 |
| 11,052,851 B1 * | 7/2021 | Anvari .................. | G16H 40/63 |
| 2016/0285703 A1 * | 9/2016 | Joe ....................... | H04L 41/5051 |
| 2017/0099353 A1 * | 4/2017 | Arora ...................... | H04L 67/22 |
| 2018/0191729 A1 * | 7/2018 | Whittle ................... | H04L 67/12 |
| 2019/0335479 A1 | 10/2019 | Thubert et al. | |
| 2020/0348662 A1 * | 11/2020 | Cella .................... | G05B 23/024 |

\* cited by examiner

*Primary Examiner* — Backhean Tiv
(74) *Attorney, Agent, or Firm* — Procopio, Cory, Hargreaves & Savitch, LLP

(57) ABSTRACT

Example implementations described herein generate plans for the deployment of functions involving the distribution function and the allocation of network resources based on the requirements of the distributed functions on the control system and the network information constituting the control system. Example implementations involve gathering requirements of the distributed functions constituting the distributed control system, information of the network, and information of the plurality of communication devices, and generating a plan for deployment of the distributed functions to corresponding ones of the plurality of communications devices and allocation of network resources to the corresponding ones of the plurality of communication devices based on the gathered requirements and the information of the network.

16 Claims, 17 Drawing Sheets

CONTROL NETWORK PLANNING

BACKGROUND

Field

The present disclosure is generally directed to control systems, and more specifically, to systems and methods to facilitate control network planning.

Related Art

As a control system, control computers control one or more control objects over the network. In such a control system, the appropriate control network is selected and applied depending on its application and/or requirements. From a technical point of view, the advanced demands of these control systems have brought about technological progress in the control network. Requests for such control networks have been diverse for various reasons such as communication delay, cost reduction, number of connections, time synchronization accuracy, connection distance, common communication medium and communication data model, redundant communication and so on.

A communication scheme involving a series of IEEE standards called Time Sensitive Network (TSN) is based on time slot communication. It is a network with improved time determinability in the communication delay between communication devices. It is a control network in which IEEE 802.3 standard can be applied to control systems.

By using time slot communications, while satisfying the requirements in the control communication for control systems, such as real-time (e.g., determinability of communication delay), it is possible to mix information and communications such as information and communications technology (ICT). It is expected to construct industrial Internet of Things (IoT) systems that combine information technology (IT) and operational technology (OT).

However, when a distributed control system utilizing these control networks is large-scale, complicated, or to achieve high reliability by redundancy (communication path and function), it is difficult to deploy distributed functions constituting the distributed control system and configure the network resources such as time slots in network switches and terminal communication devices constituting the control network properly.

SUMMARY

To address the issues in the related art, example implementations involve the deployment of functions constituting the distribution function and the allocation of network resources based on the requirements of the distributed functions on the control system and the network information constituting the control system.

Aspects of the present disclosure can involve a planning node configured to deploy distributed functions to a distributed control system involving a network and a plurality of communication devices facilitating an Internet of Things (IoT) system involving servers and edge computers, the distributed functions involving one or more of artificial intelligence (AI) functions or control functions facilitating the IoT system, the planning node involving a processor, configured to gather requirements of the distributed functions constituting the distributed control system, information of the network, and information of the plurality of communication devices, and generate a plan for deployment of the distributed functions to corresponding ones of the plurality of communications devices and allocation of network resources to the corresponding ones of the plurality of communication devices based on the gathered requirements and the information of the network.

Aspects of the present disclosure can involve a planning node configured to deploy distributed functions to a distributed control system involving a network and a plurality of communication devices facilitating an Internet of Things (IoT) system involving servers and edge computers, the distributed functions involving one or more of artificial intelligence (AI) functions or control functions facilitating the IoT system, the planning node involving means for gathering requirements of the distributed functions constituting the distributed control system, information of the network, and information of the plurality of communication devices, and means for generating a plan for deployment of the distributed functions to corresponding ones of the plurality of communications devices and allocation of network resources to the corresponding ones of the plurality of communication devices based on the gathered requirements and the information of the network.

Aspects of the present disclosure can involve a method for a planning node configured to deploy distributed functions to a distributed control system involving a network and a plurality of communication devices facilitating an Internet of Things (IoT) system involving servers and edge computers, the distributed functions involving one or more of artificial intelligence (AI) functions or control functions facilitating the IoT system, the method involving gathering requirements of the distributed functions constituting the distributed control system, information of the network, and information of the plurality of communication devices, and means for generating a plan for deployment of the distributed functions to corresponding ones of the plurality of communications devices and allocation of network resources to the corresponding ones of the plurality of communication devices based on the gathered requirements and the information of the network.

Aspects of the present disclosure can involve a computer program having instructions for a planning node configured to deploy distributed functions to a distributed control system involving a network and a plurality of communication devices facilitating an Internet of Things (IoT) system involving servers and edge computers, the distributed functions involving one or more of artificial intelligence (AI) functions or control functions facilitating the IoT system, the instructions involving gathering requirements of the distributed functions constituting the distributed control system, information of the network, and information of the plurality of communication devices, and means for generating a plan for deployment of the distributed functions to corresponding ones of the plurality of communications devices and allocation of network resources to the corresponding ones of the plurality of communication devices based on the gathered requirements and the information of the network. The instructions may be stored on a non-transitory computer readable medium and configured to be executed by one or more processors.

DETAILED DESCRIPTION

Figure 1:
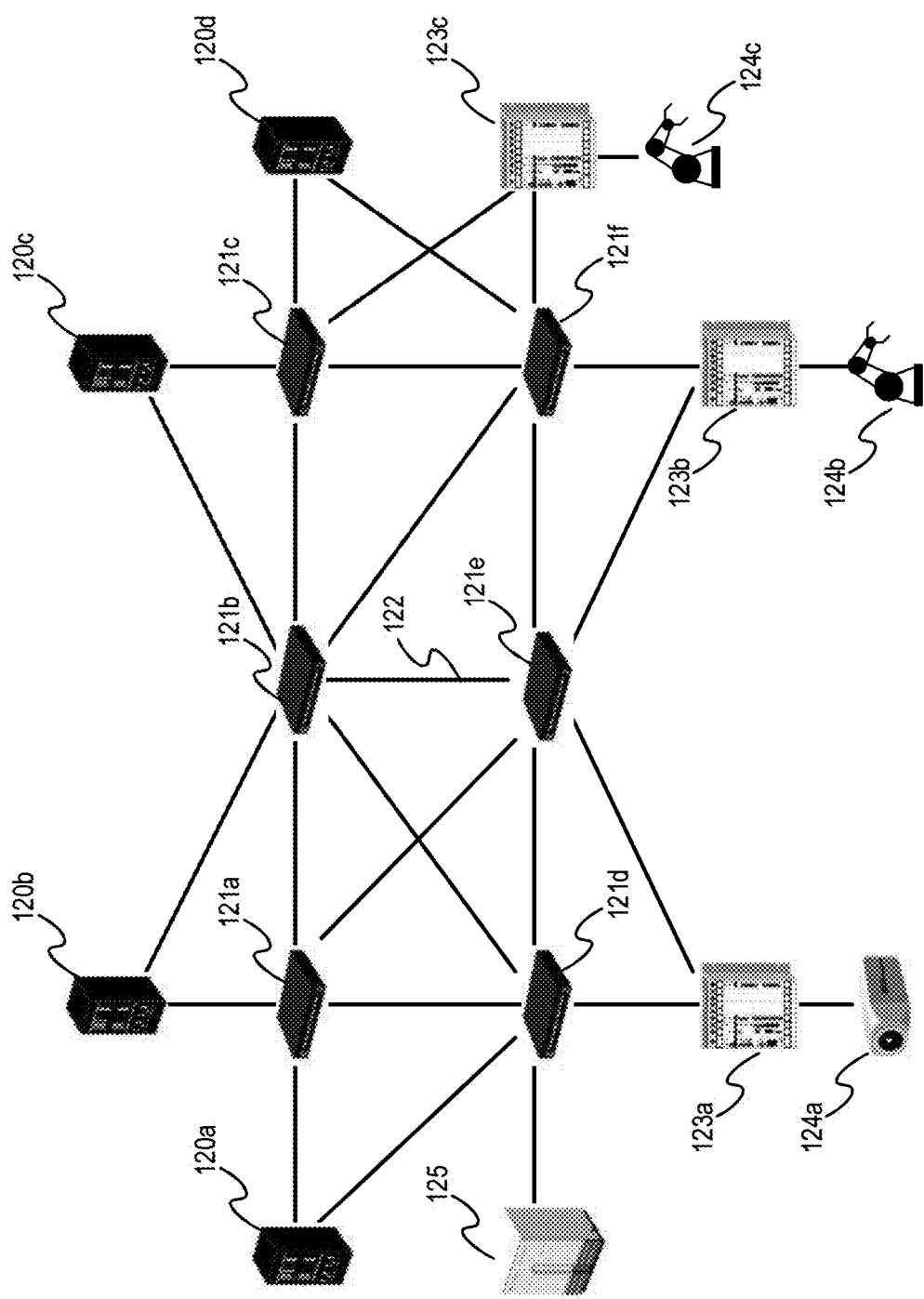
FIG. 1 illustrates an example configuration of the control system in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example configuration of the control system in accordance with an example implementation. Control devices 120*a*-120*d*, via network relay devices 121*a*-121*f* and control network 122, connects and communicates to the input and output (I/O) control devices 123*a* to 123*c*.

A control device 120*a*-120*d* performs the transmission of the control command value for controlling controlled devices 124*a*-124*c*, the acquisition of measurement value and sensor information of controlled devices 124*a*-124*c* such as sensors or actuators, and various settings by transmitting and receiving communication packets with I/O control devices 123*a*-123*c*.

A control device 120*a*-120*d* such as a central control unit in a distributed control system (DCS) and protection relays of a power system may exchange sampling data, control commands, and state signals in a control system. The data in the same control system can be integrated in a packet.

A dedicated controller, an industrial Personal Computer (PC), a control computer, a DCS controller, a SCADA (Supervisory Control and Data Acquisition) server, a PLC (programmable logic controller), an IED (intelligent electronic device), a protection relay, cloud, a server are examples of the control device 120*a*-120*d*.

A network relay device 121*a*-121*f* is a relay device in the control network 122. Packets communicated among the control devices 120*a*-120*d*, the I/O control devices 123*a*-123*c* and the network relay devices 121*a*-121*f* are routed and transferred.

A TSN-compatible switch, a L2 switch, a network switch including a L3 switch, a bridge, a router, an IEEE 1588 TC (Transparent Clock), BC (Boundary Clock), an OpenFlow switch, a RedBox defined by IEC 62439-3, a QuadBox, an optical switch, an optical oscillator, a various network relay apparatus such as an optical device are exemplified the network relay device 121*a*-121*f*.

Control network 122 is a network for connecting the control devices 120*a*-120*d*, the network relay devices 121*a*-121*f*, and the I/O control devices 123*a*-123*c*. IEEE 802.3 (Ethernet), IEC61784, IEC61784-2 Communication Profile Family 12 (hereinafter, EtherCAT (registered trademark)), various industrial networks including the control network defined in IEC61158, IEEE communication standards related to TSN, DNP (Distributed Network Protocol) 3, IEC 61970, HSR (High availability Seamless Redundancy) and PRP (Parallel Redundancy Protocol) in IEC62439-3, Ring network, IEEE 802.17 RPR, CAN (Controller Area Network: Registered trademark), DeviceNet, RS-232C, RS-422, RS-485, ZigBee (registered trademark), Bluetooth (registered trademark), IEEE 802.15, IEEE 802.1, mobile communications, OpenADR, ECHONET Lite (registered trademark), OPENADR (registered trademark), various wireless communication such as Wifi and 5G are examples of the control network 122.

In addition, IEC61850, OPC UA (Unified Architecture), DDS (Data Distribution Service), IEC 61850-7-420, IEC 60870-5-104 are exemplified as the upper layer protocol. Alternatively, the above-mentioned protocols may be layered. For example, the contents of the data are in the TSN packet is exemplified to apply the OPC UA standard.

An I/O control device 123*a*-123*c* is connected to controlled device 124*a*-124*c* such as sensors and actuators and control and configure them in accordance with the control command received from the control device 120*a*-120*d* via the control network 122. Further, it obtains the state and information of the controlled device 124*a*-124*c*, and transmits them to the control device 120*a*-120*d* via the control network 122.

A dedicated controller, an industrial PC, a control computer, a DCS Controller, a SCADA device, a PLC, an TED, a MU (Merging Unit), a protection relay are examples of the I/O control device 123*a*-123*c*.

A controlled device 124*a*-124*c* is a device that is controlled by the I/O control device 123*a*-123*c*. An industrial robot such as a mobile robot and a robotic arm, a chip mounter, a machine tools table, processing equipment, a machine tool, semiconductor manufacturing equipment, or a motor in a manufacturing apparatus, an inverter and, a circuit breaker, power equipment such as a disconnection vessel, various sensor (encoders, temperature sensors, pressure sensors, etc.) are exemplified as the controlled device 124a-124c.

A network planning apparatus 125 is a communication apparatus presenting the invention, controls the network resources in the control devices 120a-120d, the network relay devices 121a-121f, and the I/O control devices 123a-123c. Such network resources can include, but are not limited to, communication bandwidth, time slot width in time division multiple access method, parameters related to virtual network (VLAN) such as priority, communication type (identifiers, etc.), setting of the communication path to be redundant, and the like.

Network planning apparatus 125 is possible to obtain the state of the control devices 120a-120d, the network relay devices 121a-121f, and the I/O control devices 123a-123c by communicating with those devices.

A communication control device such as an OpenFlow Controller in SDN, and a dedicated communication device are examples of the network planning apparatus 125.

Incidentally, the number of the network relay devices 121a-121f in FIG. 1 can be any number in accordance with the desired implementation, and the number of communication paths between a control device 120a-120d and an I/O control device 123a-123c can be different.

Further, the control device 120a-120d and the I/O control device 123a-123c are distinguished, but a communication device may involve both roles in one device depending on the desired implementation.

There may be one or more control devices 120a-120d in the control system.

As the control system shown in FIG. 1, control systems such as DCS for FA (Factory Automation) and PA (Process Automation), monitoring and protection control systems in power systems, industrial equipment, semiconductor manufacturing equipment, in-vehicle systems, control systems in construction machinery and railway vehicles, railway ground signal system, control systems in an aircraft are applicable examples. Alternatively, an IoT system to improve the performance of the control system by using artificial intelligence applied for the information collected via the control network 122 on the control device 120a-120d or a cloud or a computer is also applicable.

Figure 2:
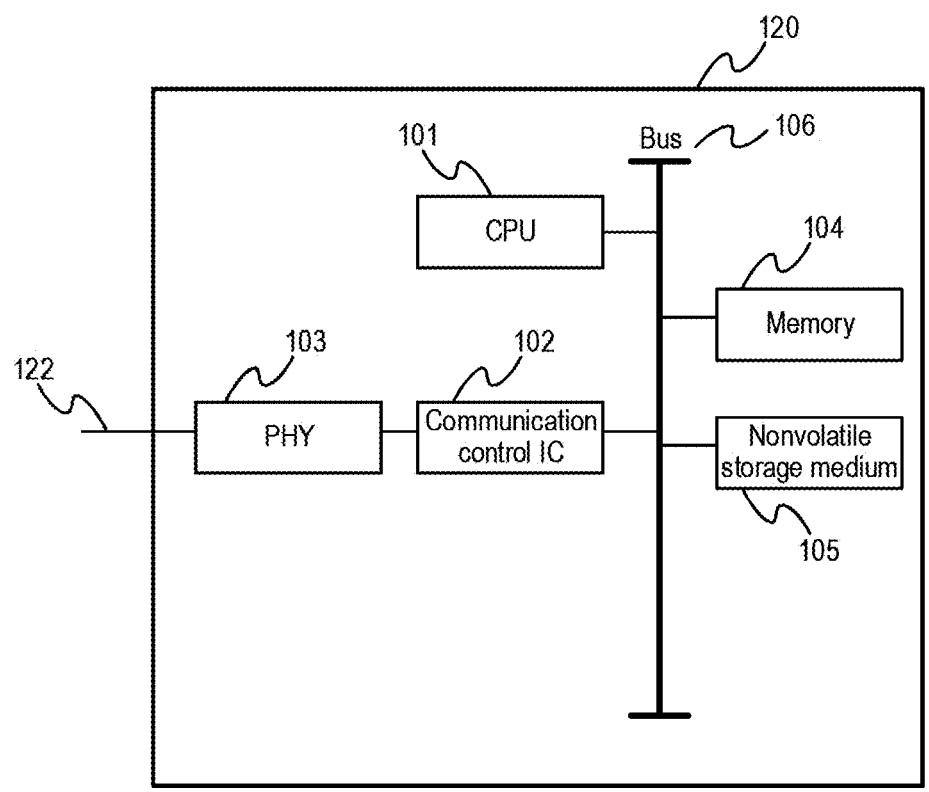
FIG. 2 illustrates the hardware structure of the control device and the network planning apparatus, in accordance with an example implementation.

FIG. 2 illustrates the hardware structure of the control device 120 and the network planning apparatus 125, in accordance with an example implementation. Central Processing Unit (CPU) 101 transfers programs from the nonvolatile storage medium 105 to the memory 104 and executes them. The operating system (hereinafter referred to as OS) and application programs operating on the OS are exemplified as the execution programs. Programs operating on the CPU 101 operate settings of the communication control integrated circuit (IC) 102 and obtain the state information.

Communication control IC 102 receives transmission requests, transmission data from software running on the CPU 101, and transmits to the control network 122 using physical layer (PHY) 103. Also, the communication control IC 102 transfers the data received from the control network 122 to the CPU 101, the memory 104, and the nonvolatile storage medium 105 via the bus 106.

Communication control IC 102 also provides a function for running a time synchronization protocol using a network. That is, the communication control IC 102 controls the timestamping at the time of transmission and reception of the time synchronization packets, setting the correction value to the synchronous packet, and the addition of the residential time to the correction value.

Such time synchronization protocols include IEEE1588, IEEE802. 1AS, NTP, SNTP, and so on, in accordance with the desired implementation. As a correction value, IEEE1588 Correction Field (CF) is an applicable example. In addition, another example can involve supporting a time management function based on the synchronized time. Such time management functions include the interruption at the specified time, generation of alarm signals, interruption at a predetermined period, and providing synchronized time to other function units and devices.

An implementation of the communication control IC 102 is an FPGA (Field Programmable Gate Array), a CPLD (Complex Programmable Logic Device), an ASIC (Application Specific Integrated Circuit), an IC such as gate arrays, and so on in accordance with the desired implementation. Alternatively, it may be constituted by integrating with the CPU 101. The communication control IC 102 may be an IEEE 802.3 communication device including MAC layer and/or PHY layer. In this case, the implementation example of the communication control IC 102 is an IEEE 802.3 MAC (Media Access Control) chip, a PHY (physical layer) chip, and a MAC/PHY composite chip. Incidentally, the communication control IC 102 may be included in CPU 101 or a chip set that controls the information path inside a computer. Further, in the structure of FIG. 2, only the single communication control IC 102 is shown, but the number of communication control IC 102 may be a plurality.

PHY 103 is a transceiver IC that implements the communication function with the control network 122. IEEE 802.3 as a communication standard provided by PHY 103 is an example of the communication function. In the structure of FIG. 2, since the PHY 103 and the communication control IC 102 is connected, IEEE 802.3 Media Access Control (MAC) processing is included in the communication control IC 102. However, the effect of the present example implementation remains in the structure for placing a MAC function IC between the communication control IC 102 and PHY 103, and in the structure for connecting the communication control IC 102 and the communication IC combining MAC function IC and PHY 103. Incidentally, PHY 103 may be included in the communication control IC 102. Further, in the structure of FIG. 2, only one PHY 103 is shown, but the number of PHY 103 may be a plurality depending on the desired implementation.

The memory 104 is a temporary storage area for CPU 101 to operate; it stores OS and application programs transferred from the nonvolatile storage medium 105.

Nonvolatile storage medium 105 is a storage for information and is used to store programs for operating the CPU 101 such as OS, applications, and device drivers, etc. and execution results of the programs. As for the nonvolatile storage medium 105, hard disk drive (HDD), solid state drive (SSD), flash memory are examples that can be used. Further, as an external removable storage medium, floppy disk (FD), CD, DVD, Blu-ray™, USB memory, compact flash, and so on, are possible examples.

Bus 106 connects the CPU 101, the communication control IC 102, the memory 104, the nonvolatile storage medium 105. Peripheral Component Interconnect (PCI) Bus, Industry Standard Architecture (ISA) bus, PCI Express bus, system bus, memory bus, etc. are examples of the bus 106.

Figure 3:
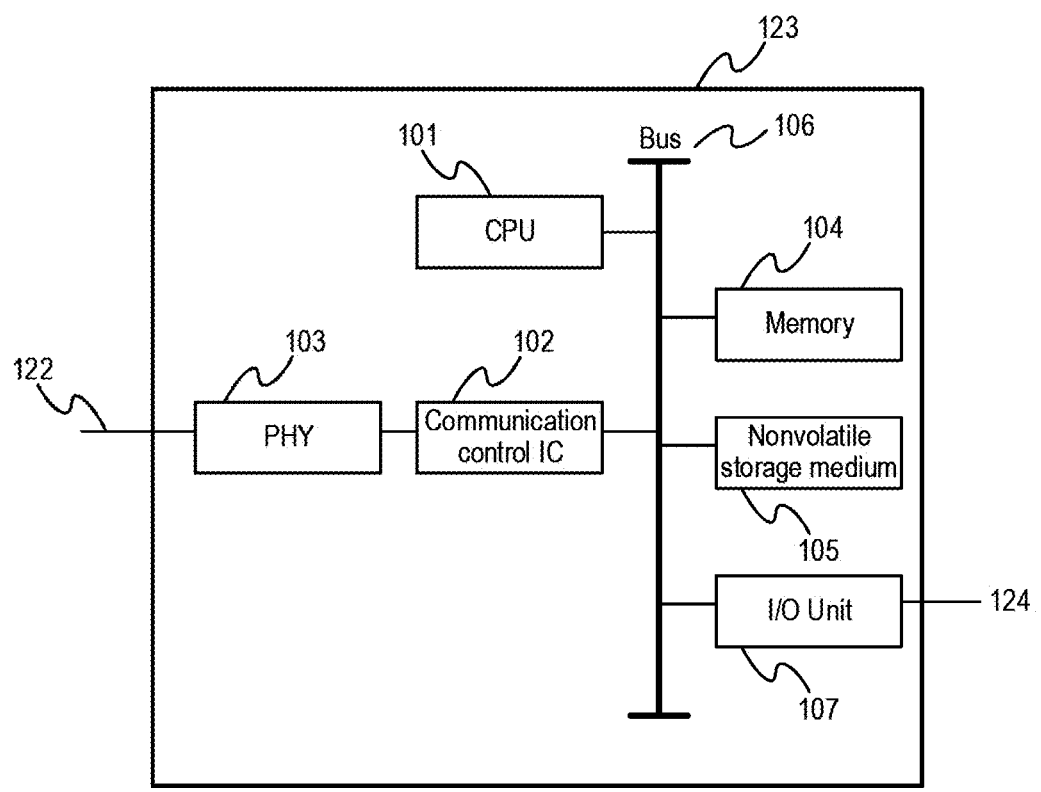
FIG. 3 illustrates the hardware structure of the I/O control device, in accordance with an example implementation.

FIG. 3 illustrates the hardware structure of the I/O control device 123, in accordance with an example implementation.

I/O unit 107 is an input-output interface for controlling the controlled device 124 or acquiring the information of the controlled device 124. Various digital input and output interfaces and analog I/O IC are examples that can be used as the I/O unit 107. Although the signal line from the I/O unit 107 is shown in one, but it may be plural depending on the controlled device 124.

Figure 4:
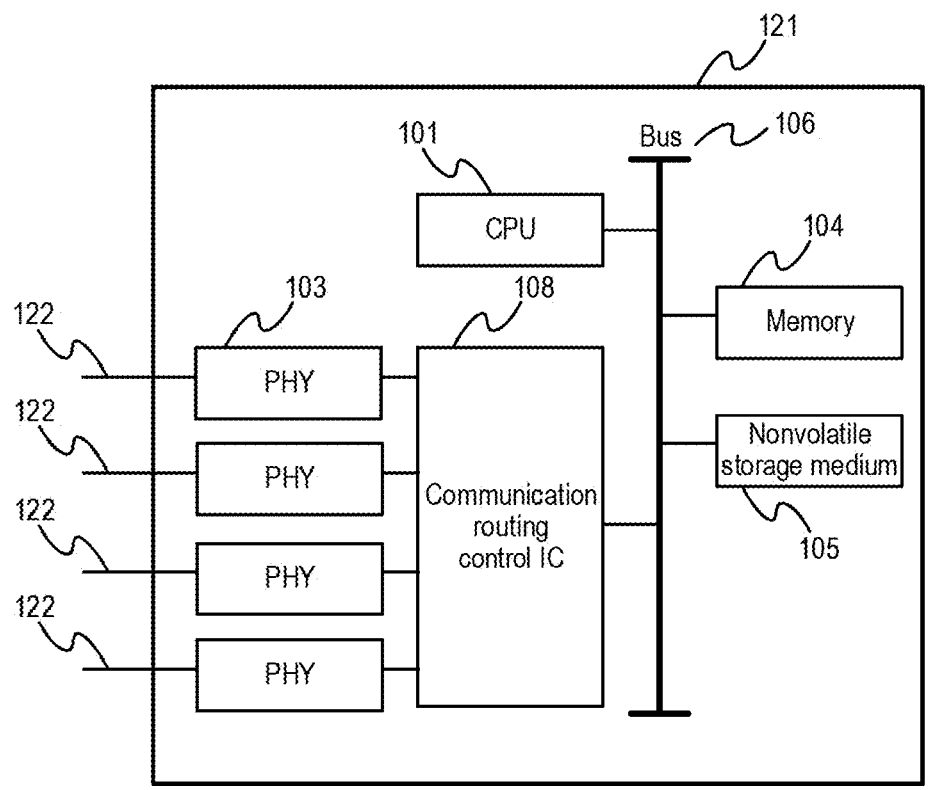
FIG. 4 illustrates the hardware structure of the network relay device, in accordance with an example implementation.

FIG. 4 illustrates the hardware structure of the network relay device 121, in accordance with an example implementation. Communication routing control IC 108 connects one or more PHY 103 and the bus 106, and executes routing control of received packets. Communication routing control IC 108 may connect to the bus 106 and communicate with the communication control IC 102 via the bus 106.

FPGA, CPLD, ASIC, IC such as a gate array, and so on are examples of the communication routing control IC 108. Incidentally, the communication routing control IC 108 may be included in the CPU 101 or the chip set that controls the information path inside the computer, depending on the desired implementation. Further, any number of PHY 103 can be used to facilitate the desired implementation.

Figure 5:
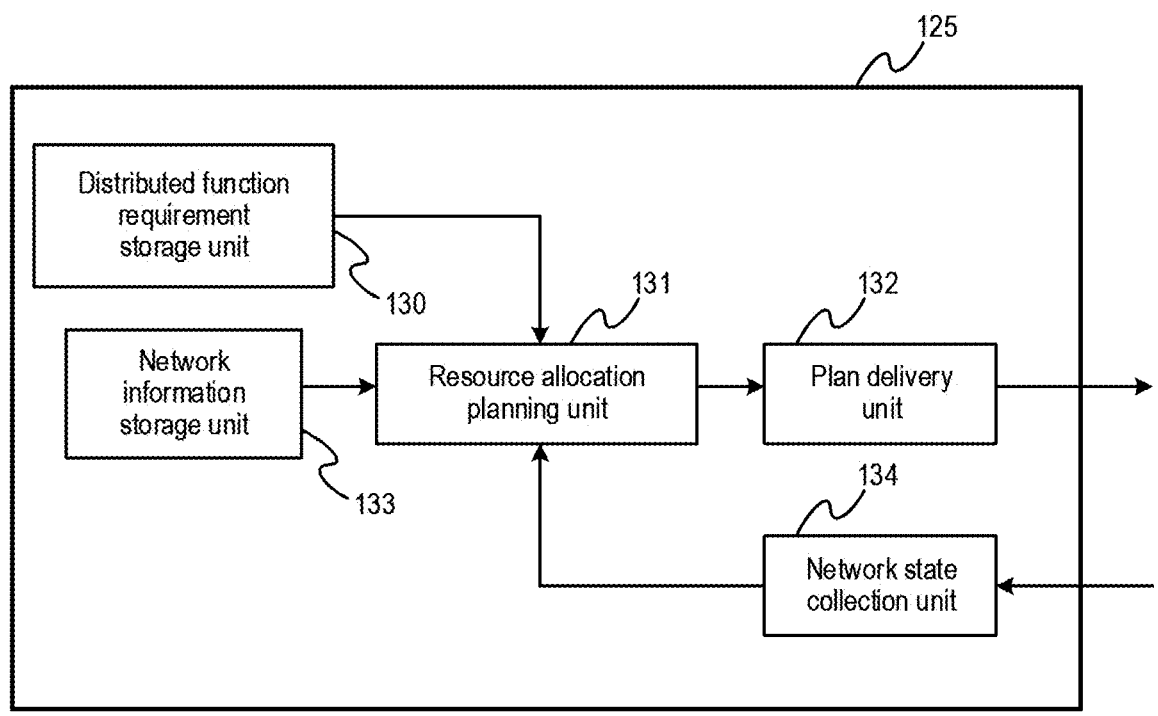
FIG. 5 illustrates the functional structure of the network planning apparatus, in accordance with an example implementation.

FIG. 5 illustrates the functional structure of the network planning apparatus 125, in accordance with an example implementation. Distributed function requirement storage unit 130 stores requirements of the functions constituting the control system shown in FIG. 1. Such requirements include communication delay and communication cycle between functions, control period, communication throughput, redundancy of communication path or redundancy of the function itself, communication bandwidth, specific sensor or actuator to be used, the phase (timing) difference of the communication between the functions. Communication delay refers to the amount of time it takes for the packet to travel from the sender (the source function) to the receiver (the destination function). Communication cycle refers to the period of time over which the sequence of communications in a control loop. Control period refers to the period of time over which the sequence of control operations such as sensor reading, command calculation, and output to an actuator. Communication throughput is the rate of successful message delivery over a communication channel. Redundancy of communication path refers to the degree of communication redundancy between the functions. In other words, it refers to the number of available communication paths between the functions. Redundancy of the function refers to the number of the function including redundant or duplicated functions of the function. Communication bandwidth is the maximum rate of data transfer across a given path. The phase (timing) difference of the communication between the functions refers to the time difference between the commutation processes (e.g. transmission or reception of a packet) of the functions. An example of this requirement is 300 μs between the transmission timing of a function and the transmission timing of another function in a communication cycle.

Distributed function requirement storage unit 130 is illustrated to be realized in the nonvolatile storage medium 105 or CPU 101 or applications running on CPU 101 depending on the desired implementation.

Setting requirements to the distributed function requirement storage unit 130 may be input by an operator online explicitly (e.g., through a user interface). In another example implementation, each communication device may hold the requirements and notify them to the distributed function requirement storage unit 130 when the communication device connected to the control network 122, wherein the requirements are then gathered from each communication device. The subject holding the requirements is not limited to the communication device; it may be an application program or virtual machine, or a container software depending on the desired implementation.

Resource allocation planning unit 131 plans resource allocation of the control device 120, the network relay device 121, and the I/O control device 123 constituting the control system, based on the requirements of the function to be stored in the distributed function requirement storage unit 130, the network information stored in the network information storage unit 133, the state of the network collected by the network state collection unit 134.

The planned results are distributed to one or more of the control device 120, the network relay device 121, and the I/O control device 123 by the plan delivery unit 132. The resource allocation planning unit 131 is illustrated to be implemented in CPU 101 or applications running on CPU 101 depending on the desired implementation. The plan delivery unit 132 delivers results of the resource allocation planned by the resource allocation planning unit 131 to one or more of the control device 120, the network relay device 121, or the I/O control device 123 via the control network 122.

IEEE standards related to OpenFlow and TSN (IEEE 802. 1Qat, IEEE 802. 1Qcc, IEEE 802. 1Qca, etc.) and proprietary protocols are examples of the protocol for the delivery. The proprietary protocol includes information on at least the type of network resources to be controlled and the information that defines how to control them. It is also possible to include the time of changing the control of the network resource or the duration at absolute time or relative time depending on the desired implementation. The absolute time may be a time unified in the control system.

The plan delivery unit 132 is illustrated to be realized using the communication control IC 102 or/and PHY 103.

The network information storage unit 133 stores information on the control network 122 constituting the control system. The information to be stored are the network topology facilitated by the control device 120, the network relay device 121, and the I/O control device 123, communication delay and communication medium between the communication devices, communication throughput, communication protocols to be used, parameters related to the setting of the time slot in the network relay device 121 (e.g., the number of communication queue, temporal resolution in the setting of the timeslot, and so on), parameters related to the setting of VLAN (e.g., the number of priorities and the type of the priorities, and so on), operating performance of the control device 120 (CPU frequency and capacity of memory or storage, etc.), virtualization and container technologies supported by the control device 120 (e.g. the presence of hardware support).

The network information storage unit 133 gathers the performance and the state of the topology of the control network 122 and the network relay devices 121. Operator may input these information at the time of the start-up of the control system, or those may be collected dynamically. In an example implementation, the operator may provide an input of the requirements through a user interface or through any other method in accordance with the desired implementation.

Information collection may use ping (ICMP), Delay Request Response mechanism of IEEE1588, IEEE communication standards in TSN, path cost to build a tree topology defined in STP (Spanning Tree Protocol) or Rapid Spanning Tree Protocol (RSTP), and routing protocols such as RIP (Routing Information Protocol).

Alternatively, proprietary protocols may be used for information collection. The proprietary protocol may include the type of network resources that can be managed by a network relay device 121, the range of configurable values, the set of parameters, and the current setting situation in the information to be collected.

The network information storage unit 133 is illustrated to be realized in CPU 101 and/or applications running on or CPU 101, and/or nonvolatile storage medium 105.

The network state collection unit 134 collects the state information of the control system, the control network 122. The information to be collected may include the failure information (e.g., system down time, and so on) of the control device 120, the network relay device 121, and the I/O control device 123, and failure information (path abnormality, etc.) of the control network 122 and the like. To observe the state of the network, an example can include heartbeat information (survival monitoring) between the communication devices as periodically communicated. The network state collection unit 134 can be facilitated by one or plurality of CPU 101, applications running on CPU 101, communication control IC 102, and/or PHY103.

Figure 6:
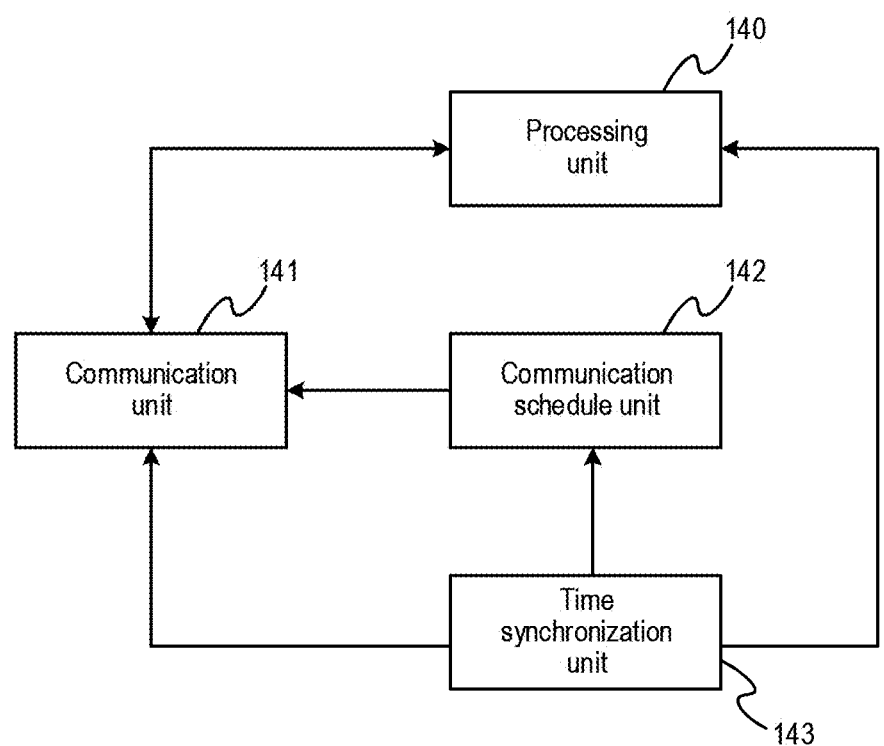
FIG. 6 illustrates the functional structure of the control device and the I/O control device, in accordance with an example implementation.

FIG. 6 illustrates the functional structure of the control device 120 and the I/O control device 123, in accordance with an example implementation. The processing unit 140 executes the processing or calculation of control operation and informational processing operation. Examples of the control operation may include the calculation of the command value required for controlling the controlled device 124 by the I/O control device 123. A command value for controlling the controlled device 124 directly may be calculated, or the target value for the I/O control device 123 to control the controlled device 124 may be calculated. For the calculation of these command values, information received from the I/O control device 123 may be used. The receiving information includes state signals of the controlled device 124.

The I/O control device 123 controls the controlled device 124 via the I/O unit 107. Or the I/O control device 123 obtains the state information and sensor information of the controlled device 124 via the I/O unit 107.

Examples of the information processing may include to present the state signal of the controlled device 124 obtained via the I/O control device 123 to the outside using a Web server or the like, the state management of the controlled device 124, or asset management (software version control and update, etc.) for a plurality of I/O control devices 123 and the controlled device 124, artificial intelligence (AI) and machine learning processing, maintenance functions such as preventive maintenance, condition based maintenance (CBM), and residual life prediction.

Processing of the processing unit 140 may be performed based on the time synchronized by the time synchronization unit 143. Processing unit 140 is illustrated to be facilitated by CPU 101 or applications running on CPU 101. The communication unit 141 connects to the control network 122 communicating in accordance with the communication protocol of the control network 122. The communication unit 141 is connected to the PHY 103 for processing the data or packets that have been notified from the bus 106 when transmitting. The process may include generating a frame from the data, duplication of data or a packet, and adding a predetermined tag, the calculation and addition of abnormal diagnostic data such as cyclic redundancy check (CRC). Examples of appended tags for transmission can involve VLAN tag defined in IEEE802. 1Q, HSR tag and PRP tag defined in IEC62439-3, and so on in accordance with the desired implementation. VLAN tag settings include settings for PCP (Priority Code Point), VID (VLAN Identifier).

The communication unit 141 transfers received packets to the processing unit 140 or the time synchronization unit 143 upon reception. The communication unit 141 may process the received packets. As the processing process, removal of tags added to the packet and extraction of data are exemplified. Further, the communication unit 141 may have an information storage means to hold information of the processed packet such as source address and tag for a certain duration. The communication unit 141 may be constituted by one or more applications running on the CPU 101, the communication control IC 102, PHY103.

The communication schedule unit 142 manages the communication schedule for the communication unit 141 to transmit a packet. This may be executed based on the time synchronized by the time synchronization unit 143. For example, the communication processing of the communication unit 141 is driven by interrupts from the hardware timer or software timer provided by the communication device.

The communication schedule unit 142 can be facilitated by one or more of CPU 101, applications running on CPU 101, the communication control IC 102, and/or PHY 103.

The time synchronization unit 143 executes the time synchronization protocol, and synchronizes the time of the control device 120 to a reference time. The time synchronization protocol to be performed may be IEEE 802. 1 AS, IEEE 1588, NTP, SNTP and the like.

The time synchronization unit 143 is facilitated by one or more of CPU 101, applications running on CPU 101, the communication control IC 102, and/or PHY 103.

Figure 7:
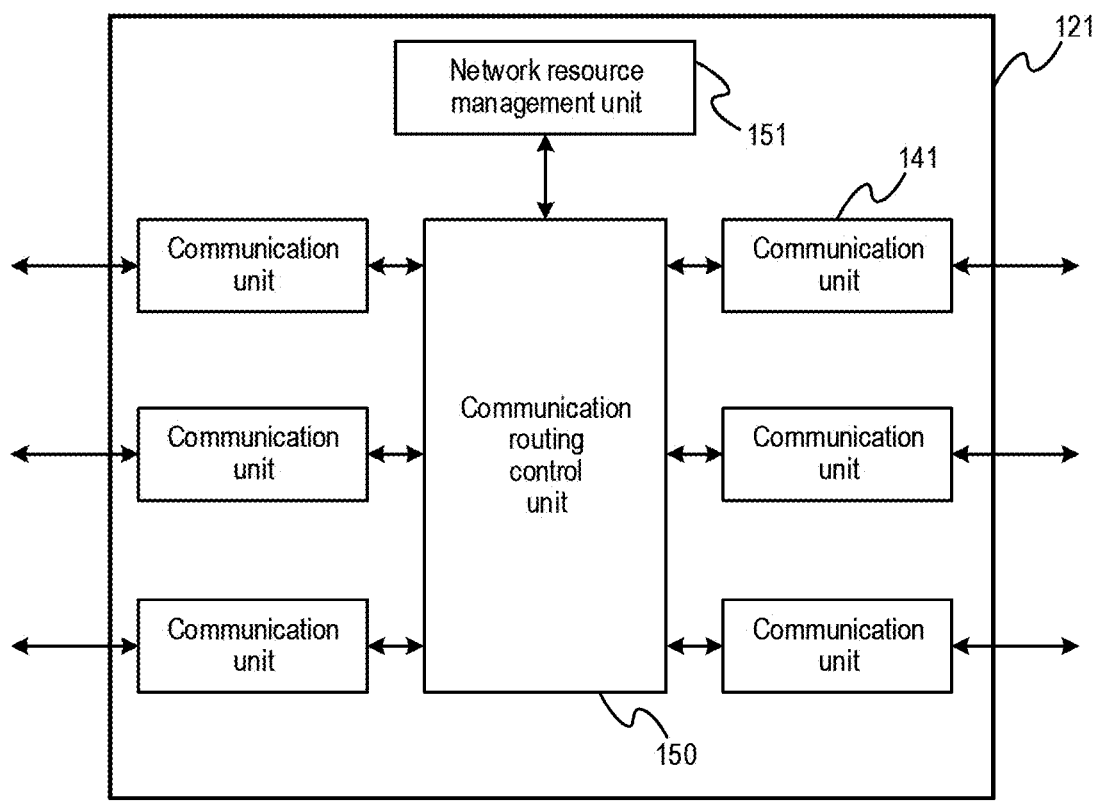
FIG. 7 illustrates the functional structure of the network relay device, in accordance with an example implementation.

FIG. 7 illustrates the functional structure of the network relay device 121, in accordance with an example implementation. The communication routing control unit 150 is connected to a plurality of communication units 141, receives packets transmitted by the communication units 141, controls a route to the forwarding destination (i.e. the corresponding communication unit 141) of the received packet based on the information on the received packet and the information set in the communication routing control unit 150.

Incidentally, the timing of the packet transmission to the communication unit 141 as the transfer destination may be immediate after the transfer destination decision, or the timing may be controlled based on priority between the packets waiting for the transfer, or the timing may be transferred for each predetermined timeslot in the time division communication method. An example of the time slot communication is IEEE 801. 1Qbv.

The communication routing control unit 150 may be constituted by one or more of CPU 101 and application running on CPU 101, FPGA, CPLD, ASIC, gate array, and the communication routing control IC 108. Incidentally, the communication routing control unit 150 may be included in the chip set that controls the information path inside CPU 101 and the computer. Further, it is also possible to incorporate a function required for communication depending on the configuration of the communication unit 141. For example, if the communication unit 141 is equivalent to PHY function, the communication routing control unit 150 can include a function equivalent to the MAC layer depending on the desired implementation.

Network resource management unit 151 manages the utilization and allocation of the network resources controls in the communication routing control unit 150 and single or plurality of the communication unit 141, and controls the network resources in the network relay device 121 based on predetermined rules, or the contents that are notified from the resource allocation planning unit 131 and the plan delivery unit 132 in the network planning apparatus 125.

Such network resources may be the communication bandwidth, time width in time division communication method, parameters such as the priority/communication timing for a communication type, a predetermined packet, and the number of communication paths to be used.

As the network resource management unit 151, CPU 101, applications running on CPU 101, communication routing control IC 108 such as LSI can be used for network processing in the network relay device 121.

Figure 8:
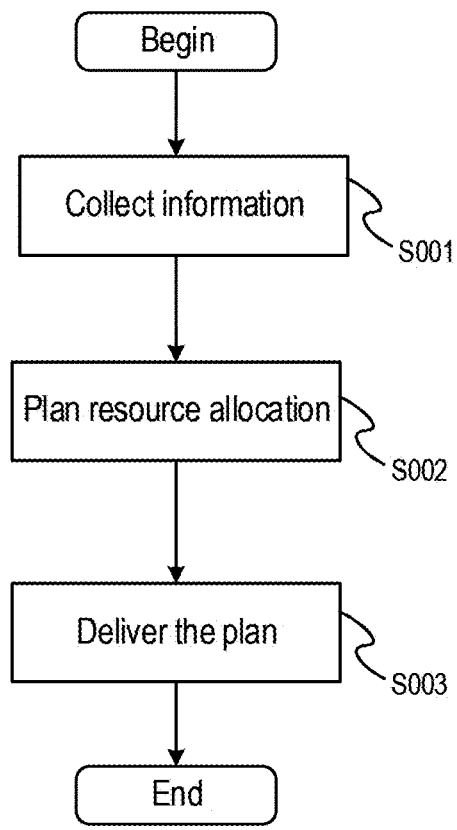
FIG. 8 illustrates the operation procedure of planning resource allocation in the network planning apparatus, in accordance with an example implementation.

FIG. 8 illustrates the operation procedure of planning resource allocation in the network planning apparatus 125, in accordance with an example implementation.

First, the network planning apparatus 125 gathers information for the planning resource allocation (S001). This indicates one or more of the extraction of requirements from the distributed function requirement storage unit 130, the extraction of network information from the network information storage unit 133, and/or the extraction of the network state from the network state collection unit 134. After collecting the information necessary to plan the resource assignment, the network planning apparatus 125 plans the resource allocation (S002). Details of the planning method will be described further herein. After the planning of the resource allocation is completed, the plan delivery unit 132 delivers the content of the plan to the control device 120, the network relay device 121, and the I/O control device 123 (S003).

In example implementations, the timing for executing the procedure shown in FIG. 8 may be prior to operation of the control system or executed periodically after operation of the control system starts. Alternatively, it may be explicitly executed by an instruction from the operator of the control system. Or, the procedure may be executed at the configuration change of the control system dynamically. Such changes include abnormality of the control network 122 or a communication device, or addition or removal of the communication device. As the network state collection unit 134 can detect the configuration changes of the control system, periodical heartbeat communications between the communication devices for the purpose of survival monitoring to notify the result to the network state collection unit 134 is exemplified.

In another example implementation, the timing for executing the procedure shown in FIG. 8 may be the timing of receiving the result of the resource allocation from the communication device. This includes the case in which the target communication device cannot accept the plan.

Figure 9:
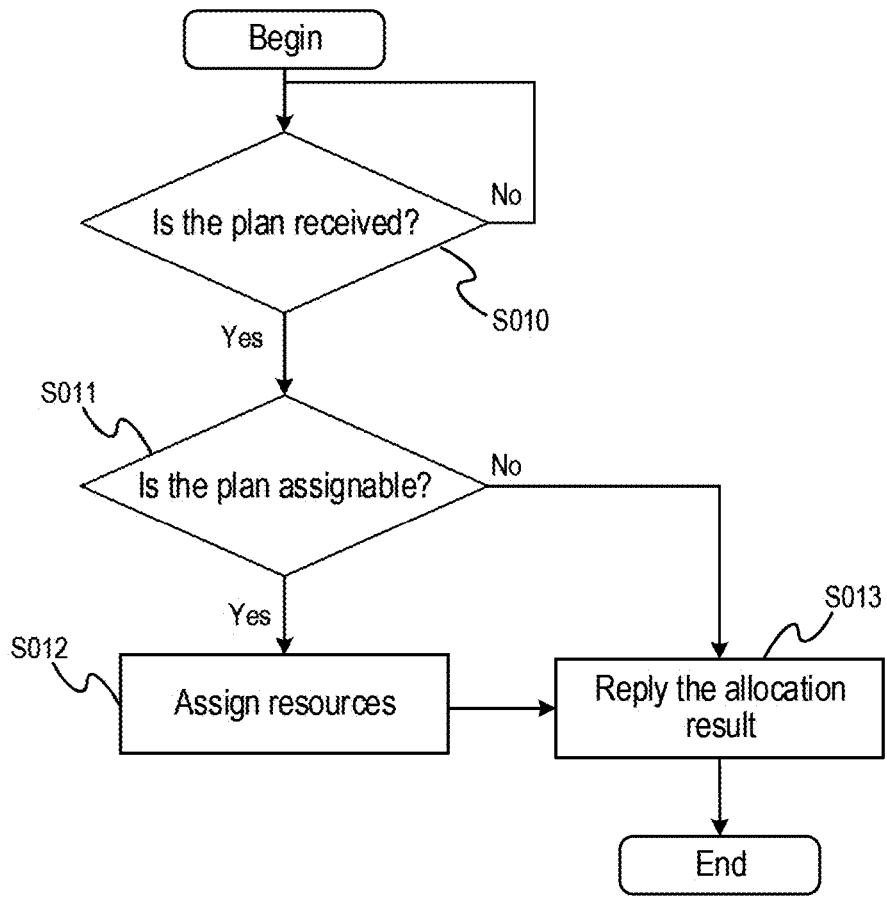
FIG. 9 illustrates an example of applying the procedure of the plan to communication devices such as the control device, the network relay device, and the I/O control device, in accordance with an example implementation.

FIG. 9 illustrates an example of applying the procedure of the plan to communication devices such as the control device 120, the network relay device 121, and the I/O control device 123, in accordance with an example implementation.

First, a communication device waits for delivery of the plan (S010). When it receives the plan, it determines whether the planning contents can be assigned in the resource of the own device (S011).

The communication device assigns the appropriate computer resources, network resources, if they can be allocated in the step S011 (S012). This is, for example, a transmission timeslot in a communication. After the step S012, or when it is not possible to allocate in the step S011, the communication device replies the allocation result to the network planning apparatus 125 (S013). Incidentally, S013 may be omitted, depending on the desired implementation.

Figure 10:
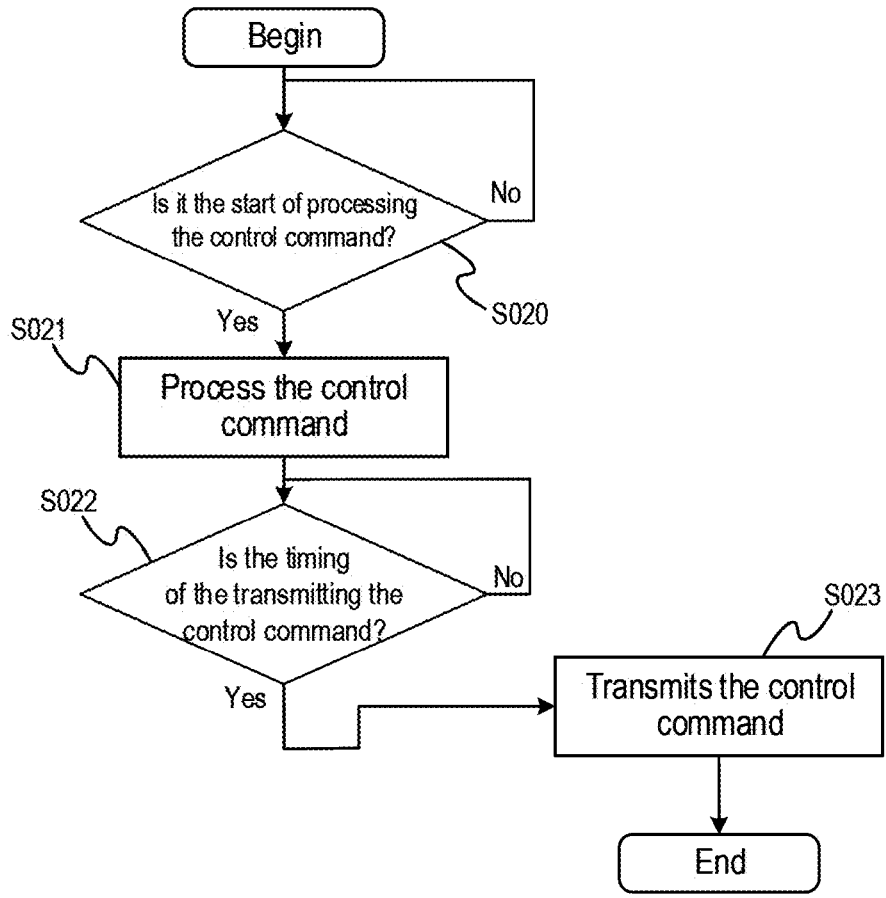
FIG. 10 illustrates the operation procedure of the control processing in the control device, in accordance with an example implementation.

FIG. 10 illustrates the operation procedure of the control processing in the control device 120, in accordance with an example implementation. First, the processing unit 140 waits for the operation start of calculating control commands (S020). This process may be started at a predetermined period, on the reception of the state information or sensor data of the controlled device 124 from the I/O control device 123, or on the start request from another control device 120, depending on the desired implementation.

Next, the processing unit 140 calculates the control command value (S021). This follows the predetermined control method. The operation of the control command value may use data received from the I/O control device 123. Next, the processing unit 140 waits for the timing of transmitting the control command value (S022). This timing is controlled by the communication schedule unit 142. Then, the processing unit 140 transmits the calculated control command value for one or more I/O control devices 123 via the communication unit 141 (S023).

Figure 11:
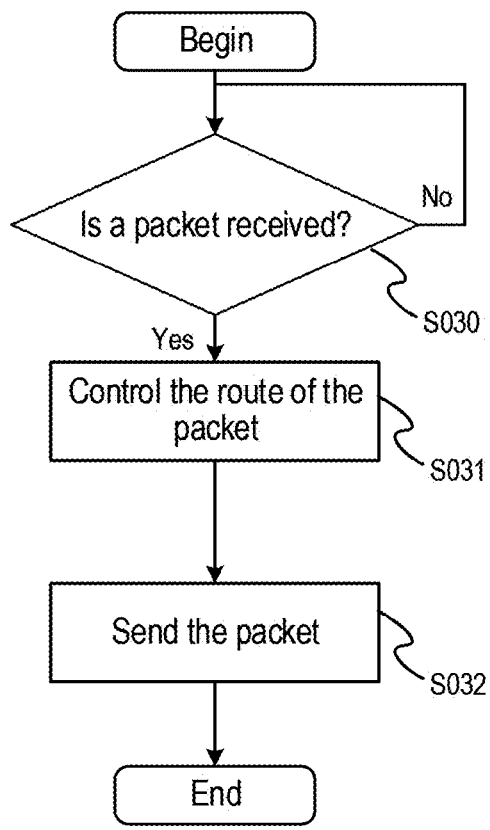
FIG. 11 illustrates the operation procedure of the transfer process in the network relay device, in accordance with an example implementation.

FIG. 11 illustrates the operation procedure of the transfer process in the network relay device 121, in accordance with an example implementation. Control command value transmitted in the step S023 is transferred to the I/O control device 123 and other control devices 120 in the procedure shown in FIG. 11.

First, the communication unit 141 of the network relay device 121 waits for the reception of a packet (S030). After receiving the packet, the communication routing control unit 150 determines transferring timing of the packet, the communication unit 141 as the transfer destination, and the transmission timing in the communication unit 141 according to the contents of the received packet, the communication unit 141 receiving the packet, and the rules of the route control set in the communication routing control unit 150 by the network resource management unit 151 (S031).

In this case, the communication unit 141 of the transfer destination may be a plurality, and the communication routing control unit 150 may add information to the packet depending on the received or transferred communication unit 141 at the time of transfer. The communication unit 141 which is transferred the packet transmits the packet at the timing controlled by the communication routing control unit 150 or the timing transmitted from the communication routing control unit 150 (S032).

Figure 12:
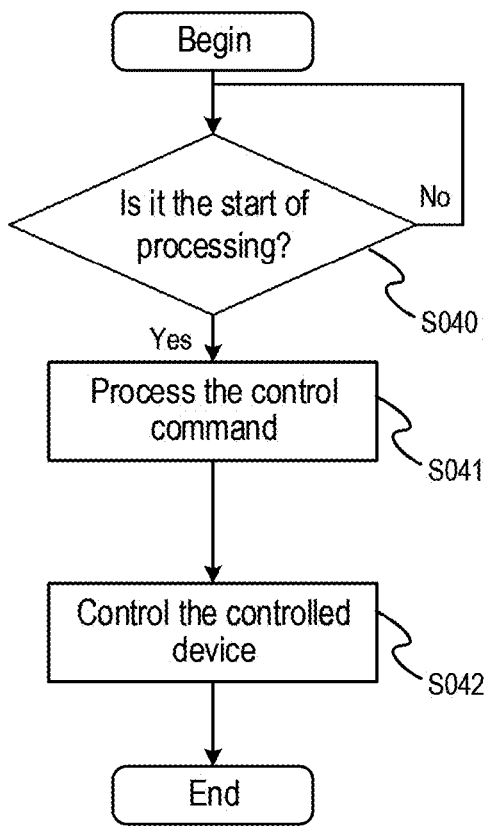
FIGS. 12 and 13 illustrate examples of the operation procedures of the control processing in the I/O control device, in accordance with an example implementation.
Figure 13:
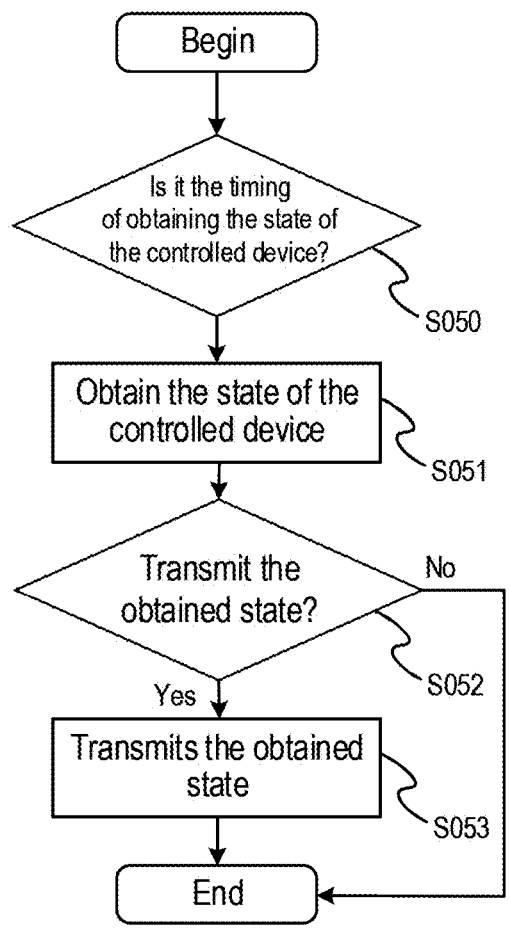

The operation procedure of the control processing in the I/O control device 123 illustrated in FIG. 12 and FIG. 13. FIG. 12 mainly shows the operation as an actuator, while FIG. 13 shows the operation as a sensor.

In FIG. 12, firstly, the processing unit 140 waits for the start of the process (S040). This processing may start at a predetermined period, or by the state change of the controlled device 124.

Next, the processing unit 140 calculates the control command value of the I/O control device 123 based on the control command value received from the control device 120 (S041). Then, the processing unit 140 controls the controlled device 124 based on the control command value calculated in the step S041 (S042).

In FIG. 13, firstly, the processing unit 140 waits for the acquisition timing of the state information, the sensor data of the controlled device 124 (S050). Then, the processing unit 140 acquires the state information, the sensor data of the controlled device 124 (S051). Next, the processing unit 140 determines whether to transmit the acquired state information, the sensor data of the controlled device 124 to the control device 120 (S052). The processing unit 140 transmits the data if it is determined to transmit (S053). This is, the data may be transmitted each time to acquire the data, or it may be transmitted every predetermined number of times acquired. In an example implementation, the acquired value may be transmitted when satisfying a predetermined condition such as a threshold comparison for the value of the data. In another example implementation, the data may be transmitted when the time acquiring the state information, sensor data matches a predetermined condition. Thus, for example, it is possible to transmit only the state information and the sensor data obtained during the daytime. In another example implementation wherein the I/O control device 123 or the controlled device 124 equips a plurality of sensors, then the data of one or more sensors may be transmitted when satisfying a predetermined condition. Or the data may be transmitted when the state of the processing unit 140 satisfies a predetermined condition. This includes, for example, when the processing load of the processing unit 140 is small.

Even in the data to be transmitted, the acquired data may be transmitted as it is, or the data applied to statistical processing may be transmitted for the value obtained multiple times. Or the result combined with the sensor data of the other sensors provided by the I/O control device 123 or controlled device 124 may be transmitted.

Incidentally, in one of the I/O control devices 123, the control processing of FIG. 12 and the acquisition process of FIG. 13 may be executed in parallel, depending on the desired implementation.

Next, a method of planning resource allocation by the resource allocation planning unit 131 is shown.

In the system shown in FIG. 1, the case of configuring the following distributed functions is used as an example.

Distributed function 1: it constitutes a control function composed of a sensor, controllers, and an actuator.
Controlled device 124a is set to the sensor, the controlled 124c is set to the actuator.
The redundancy of the controller as a control function is configured as 3.
The redundancy of the communication path between the controller functions and the controlled device 124a, and between the controller functions and the controlled device 124c is configured as 2.
The processing from the sensor to the actuator is performed at 1 ms period.
Shifting the command timing from the three controller functions to the actuator, the actuator is controlled at a period of three times of 1 ms period. Therefore, receiving time of the control command by the actuator within 1 ms period are 400 µs, 700 µs, and 1000 µs, respectively.
The calculation time of a controller function is 200 µs.
Distributed function 2: it constitutes a control function composed of a controller and an actuator.
The controlled device 124b is set to the actuator.
The processing from the controller to the actuator is performed at 1 ms period.
Distributed function 3: it constitutes an information processing function applying statistical processing to the sensor information.
The function uses the sensor information of the controlled device 124a.
The communication throughput from the sensor to the information processing function is performed at 8 Mbps.
The distribution functions are prioritized in order of 1, 2, and 3.

Figure 14:
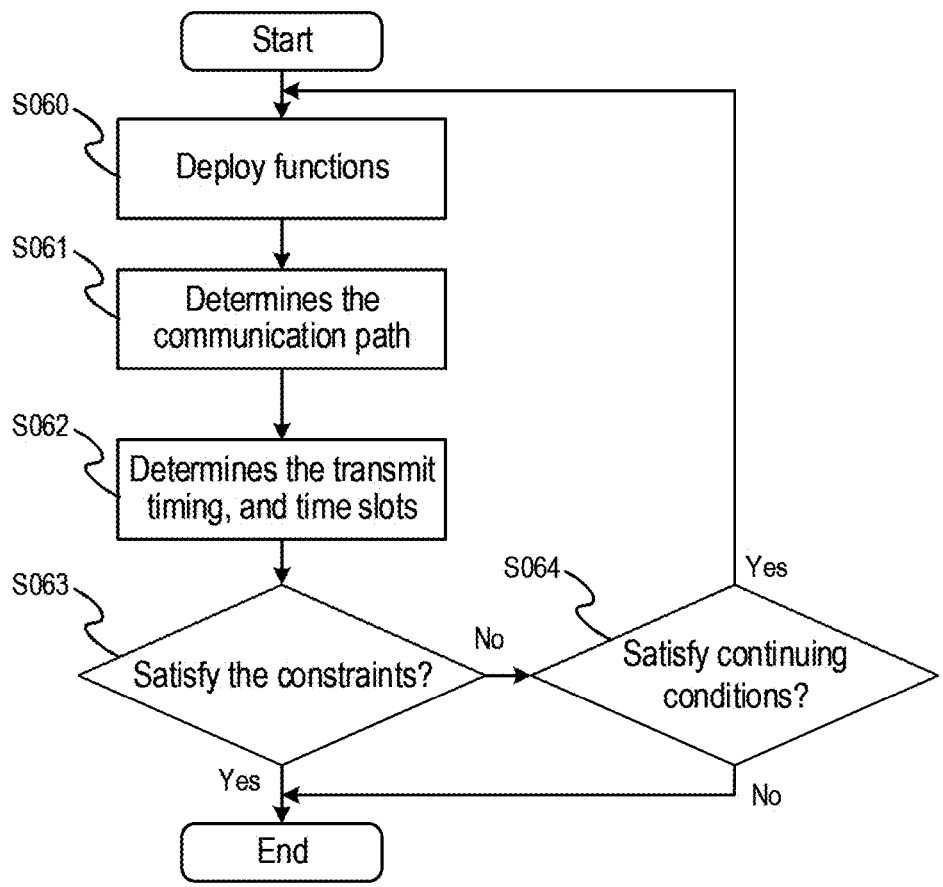
FIG. 14 illustrates an example of the planning method for an example distributed function, in accordance with an example implementation.

FIG. 14 illustrates the planning method for the distributed function 1 as an example.

First, the functions that make up the control function are arranged (S060). In the system of FIG. 1, the control devices 120 and the I/O control devices 123 are candidates. In this case, a variety of constraints are considered. For example, since the sensor function or actuator function is necessary to use the controlled device 124 having a physical device, it is determined that the sensor function is deployed in the I/O control device 123a, the actuator function is deployed in the I/O control device 123c. Since the controller function has three redundancies, different control devices 120, I/O control devices 123 are target candidates.

For the selection of the communication device, the total value of the computer performance of the communication devices deployed the function as an objective function, it is illustrated that the selection is solved as a combinatorial optimization problem to maximize the value. Examples can include maximizing the total value of CPU frequency of the selected communication device or maximizing the memory communication throughput of the selected communication device.

After determining the arrangement of the function in the step S060, the communication path between the functions to be communicated is determined (S061). The redundancy of the communication path between the controlled device 124a and the controller functions, and between the controller functions and the controlled device 124c is 2. From the options of communication path to connect the I/O control device 123a and the controller functions, two paths are selected. The selection from the controller functions and the I/O control device 123c is also the same. Examples of the constraints in this case, for high reliability, are that the same network relay device 121 should not be selected on the selected two communication paths, or minimizing of the communication hop, or maximizing the average or maximum value of the communication throughput as an objective function when the problem is handled as a path search problem in the graph theory.

When selecting the communication path, so as to be the communication path, it is exemplified to set the related parameters. Examples can involve determination of the VLAN identifier, setting of the route control, VLAN configuration, and configuration of the tag of PRP and HSR in the network relay device 121.

After the communication path is determined in the step S061, the transmission timing in the control device 120 or the I/O control device 123 deployed a function, and the time slot allocation in the network relay device 121 is determined (S062). In this case, the time slot width, transmission timing, and timeslot allocation may be solved as a combination optimization problem.

After the step S062, whether the determined configuration can satisfy the requirements of the control system is judged (S063). If satisfied (Yes in the step S063), the process ends, if not satisfied (No in the step S063), it is determined whether the planning is continuable or not (S064). As an example, the number of attempts of the planning is less than a predetermined value and the processing time taken to the planning is less than a predetermined value as the continuable condition. Alternatively, an operator of the system may determine to continue the planning. This is illustrated to configure the function of FIG. 14 as a software such as GUI (Graphical User Interface).

In the step S064, if it is determined to be continuable (Yes of the step S064), the planning is re-executed from S060. If it is not determined to be continuable (No of the step S064), the planning is terminated.

Incidentally, when it is determined that it is possible to continue in the step S064, it can be resumed from the step S061 or it can be rerun only the step S062 without re-run from the S060.

Each step of S060, S061, and S062 is considered as the optimization problem, it is exemplified to apply a variety of solutions. The solution also includes a heuristic method. Or it is also possible to perform the full search.

It is also possible to execute the S060 and S061 at the same time. For example, it may determine the communication device for arranging the function after determining the communication path as an objective function in the determination of the functional arrangement in the step S060 to evaluate the number of network relay devices 121 to be relayed.

Further, the I/O control device 123 connected to the controlled device 124 is set to a feasible communication device of sensor functions and actuator functions deployed, but those functions may be deployed in another communication device such as a control device 120 by the software provided in the I/O control device 123 as a minimum configuration for controlling the controlled device 124.

Such sensor functions and actuator functions may be the filter processing of the sensor value or controlling output timing of the actuator.

Further, in the step S063, S064, an optimal plan may be selected after a predetermined time or a predetermined number of trials without determining the termination every time planning ends.

The procedure shown in FIG. 14 is also applied to the plan of the distributed function 2 and 3. In the distributed function 2, the redundancy of the function and communication path is 1 respectively. In the distributed function 3, a constraint is communication throughput rather than a delay or a period.

Figure 15A:
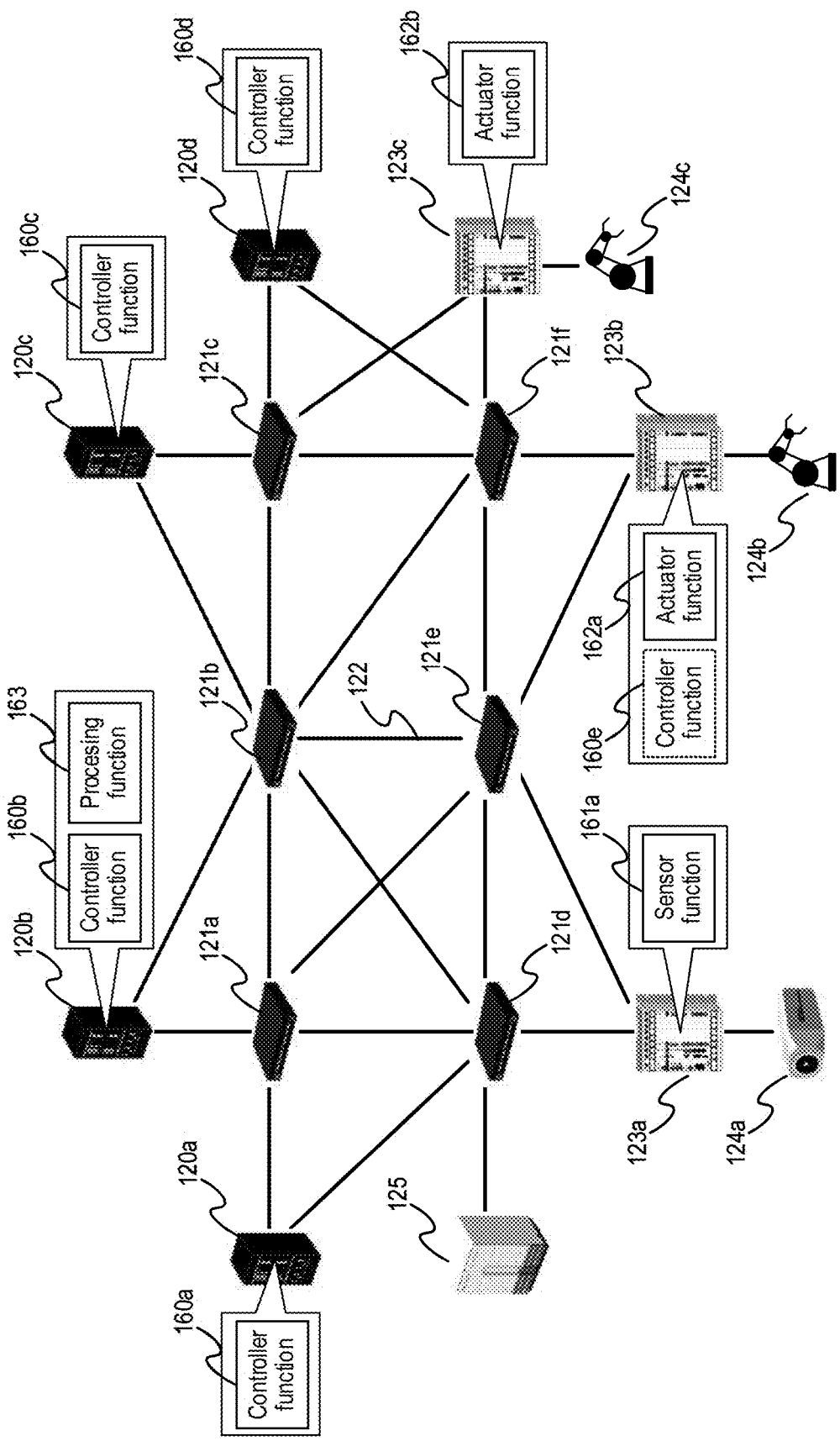
FIGS. 15(*a*) to 15(*c*) illustrate plan examples in accordance with an example implementation.
Figure 15B:
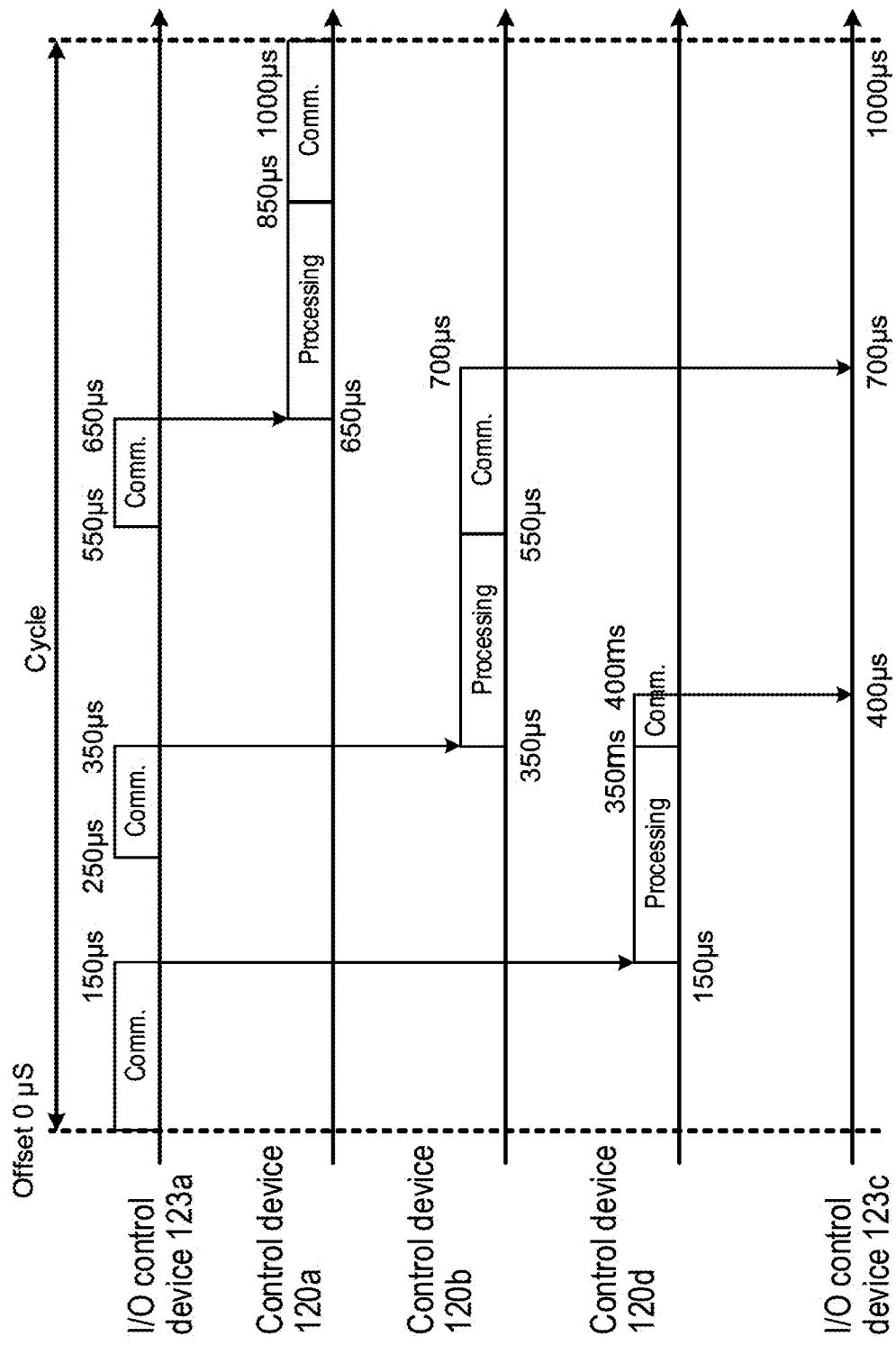
Figure 15C:
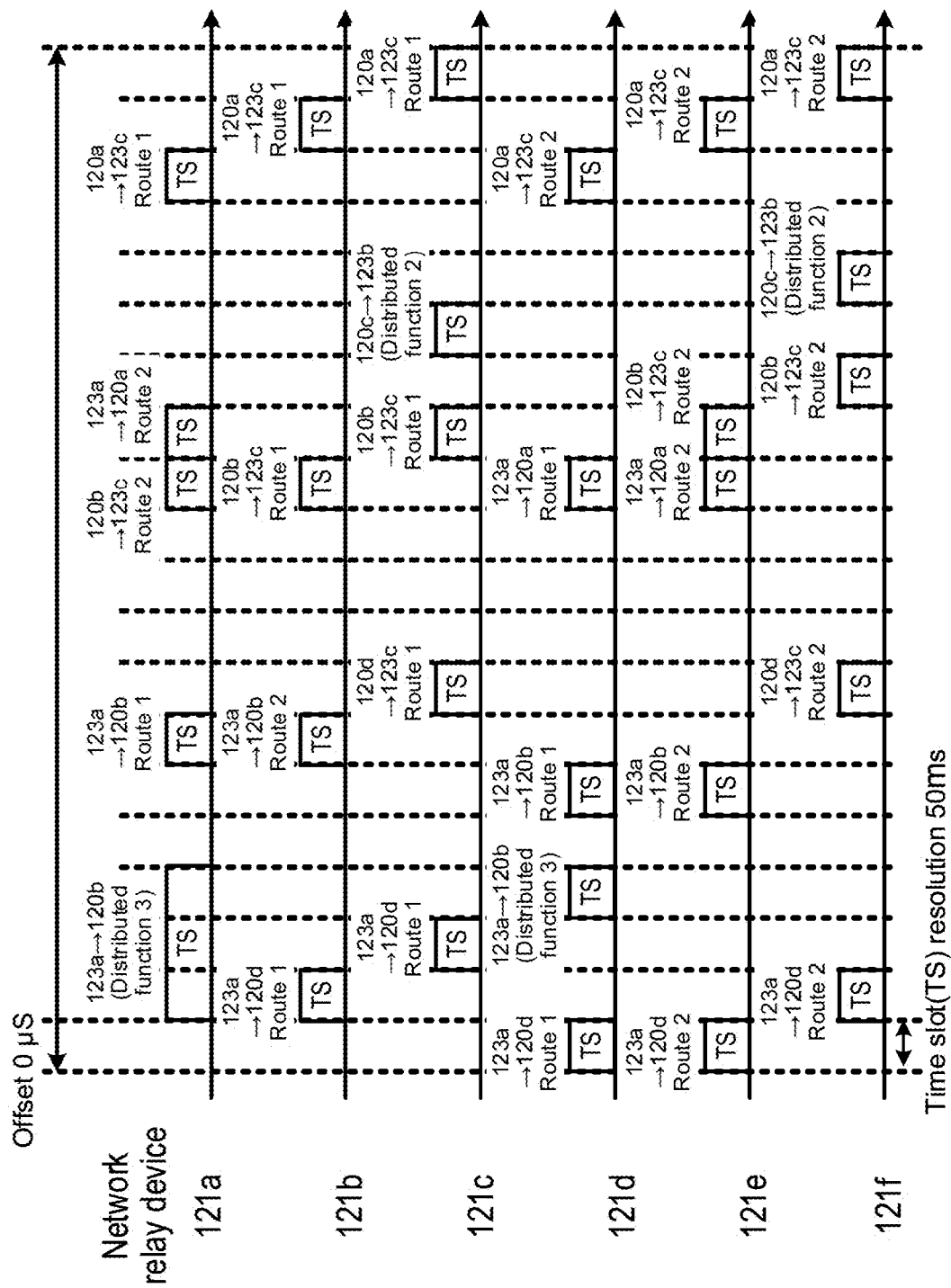

FIGS. 15(a) to 15(c) illustrate plan examples of the above distributed functions 1, 2, 3. FIG. 15(a) shows the arrangement of the functions and communication path, FIG. 15(b) shows the timing of communication in the communication devices, FIG. 15(c) shows the allocation of timeslots in the network relay devices 121.

With respect to the example distributed function 1, it is planned as follows. Controller functions 160a, 160b, and 160d are deployed in the control device 120a, 120b, 120d, respectively. The sensor function 161a is deployed in the I/O control device 123a, and the actuator function 162b is deployed in the I/O control device 123c.

Two communication paths from each of the controller functions 160a, 160b, 160d to the I/O control device 123a, 123c are selected respectively. Two communication paths in the same combination of the functions are selected so as not to overlap. The determined communication paths are as follows.

From the I/O control device 123a (the sensor function 161a) to the control device 120a (the controller function 160a): Route 1: the network relay device 121d (1 hop), Route 2: the network relay device 121e, 121a (2 hops).

From the I/O control device 123a (the sensor function 161a) to the control device 120b (the controller function 160b): Route 1: the network relay device 121d, 121a (2 hops), Route 2: the network relay device 121e, 121b (2 hops).

From the I/O control device 123a (the sensor function 161a) to the control device 120d (the controller function 161d): Route 1: the network relay device 121d, 121b, 121c (3 hops), Route 2: the network relay device 121e, 121f (2 hops).

From the control device 120a (the controller function 160a) to the I/O control device 123c (the actuator function 162b): Route 1: the network relay device 121a, 121b, 121c (3 hops), Route 2: the network relay device 121d, 121e, 121f (3 hops).

From the control device 120b (the controller function 160b) to the I/O control device 123c (the actuator function 162b): Route 1: the network relay device 121b, 121c (2 hops), Route 2: the network relay device 121a, 121e, 121f.

From the control device 120d (the controller function 160d) to the I/O control device 123c (the actuator function 162b): Route 1: the network relay device 121c, Route 2: the network relay device 121f.

The setting of the transmission timing and time slots is as shown in FIGS. 15(b) and 15(c). Time slot in the network relay device 121 is set to 50 µs. The maximum value of the number of hops among the two routes is assigned as the number of time slots. The I/O control device 123a initially transmits the sensor value to the control device 120d (150 µs from offset 0 µs). Since the communication path in route 1 is 3 hops, 150 µs, three timeslots are assigned. The controller function 160d of the control device 120d receives the sensor information from the I/O control device 123a, then the controller function 160d transmits the command value to the I/O control device 123c after processing the control calculation in 200 µs. Since the number of hop between the control device 120d and the I/O control device 123c is 1, one-slot timeslot is assigned.

The time width of a timeslot is not required to be uniform; it may be set to any time width of each timeslot depending on the desired implementation. On the other hand, it can be easier to search the optimal solution by making the time width uniform.

Depending on the desired implementation, it is also possible to place the controller function such as controller function 160 in the I/O control device such as I/O control device 123b. In this case, if the number of network relay devices to be relayed (the number of hops) is set to the evaluation index, it takes three hops from the I/O control device 123a to the I/O control device 123b (route 1 is a network relay device 121e, route 2 is the network relay device 121d, 121b, and 121f), and it also takes three hops from the I/O control device 123b to the I/O control device 123c (route 1 is the network relay device 121f, route 2 is the network relay device 121e, 121b, and 121c), six hops in total are taken from the I/O control device 123b to 123c. This is larger than the case of selecting the control device 120a, 120b, and 120d. That is why the I/O control device 123b is considered not to be selected in this example.

Incidentally, the case of the control device 120c takes 5 hops as a total, thus it may be the arrangement of the controller function such as the controller function 160c can be deployed in the control device 120c. In this case, the element other than the number of hops (e.g., computer performance of the control device 120c) may be compared.

Further, the timing of the actuator function 162b receives the command value at 400 µs, 700 µs, and 1000 µs in the 1 ms period, and this satisfies the constraint. To receive the first command value at 400 µs, the first controller function received sensor information from the sensor function 161a should be the controller function 160d.

After finishing the step S062, whether the receiving timing of the command value in the actuator function 162b are at 400 µs, 700 µs, and 1000 µs in the 1 ms period is determined at the step S063.

In the example shown in FIG. 15(a), even if the command value processing cycle performance in each control device

120*a*, 120*c*, and 120*d* is the shortest 1 ms period, controlling the actuator function 162*b* can be executed approximately for 300 µs, it is possible to achieve a performance improvement of about three times. It is due to the effect of the planning resource allocation of the example implementations for the purpose of improving the control performance by adjusting such transmission timing.

Similarly, with respect to the example distributed function 2, the actuator function 162*a* is deployed in the I/O control device 123*b*, the controller function 160*c* is deployed in the control device 120*c*, the communication path between them is via the network relay device 121*c*, and 121*f*. The arrangement of the functions and the allocation of timeslots in the network relay devices are shown in FIG. 15(*a*) and FIG. 15(*c*). Incidentally, the transmission timing is not shown.

Similarly, with respect to the example distributed function 3, the sensor function 161*a* is deployed in the I/O control device 123*a*, the information processing function 163 is deployed in the control device 120*b*, the communication path is via the network relay device 121*a* and 121*d*. The arrangement of the functions and the allocation of timeslots in the network relay devices are shown in FIG. 15(*a*) and FIG. 15(*c*). Incidentally, the transmission timing is not shown.

Three successive timeslots in the network relay device 121*a* and 121*d* are allocated in order to effectively utilize the vacant time slots.

By transmitting the 1 kbytes in the three timeslots within one cycle, it is possible to achieve 8 Mbps bandwidth by the following equation.

$$1\ \text{kbyte} \times (1\ \text{s}/1\ \text{ms}) \times (8\ \text{bit/byte}) = 8\ \text{Mbps}$$

Incidentally, the I/O control device 123*a* communicates with the communication device other than the control device 120*b* at the same timing, but this is facilitated by setting such multicast or VLAN.

Note that the controller function, the sensor function, and the actuator function may be formed as application programs, virtual machine, container software, applications allocated for each core in multicore CPU.

In addition, when the continuing conditions are not determined to be possible to meet in step S064, the system operator is notified by using a predetermined presentation means (Web server, GUI software, e-mail, etc.) in accordance with the desired implementation. By doing this, it is possible for the system operator to set up measures such as mitigating constraints towards the completion of the plan. For example, such measures may be reduction of redundancy and extension of the communication cycle, addition of communication device, communication path, and network relay device 121, performance improvement of the communication device and the like. Incidentally, mitigation of these constraints may be presented together when the resource allocation planning unit 131 of the network planning apparatus 125 executes the planning process. In this case, the resource allocation planning unit 131 searches for mitigation measures. In the example of FIG. 15(*a*), such measures include change of the unit width of the time slot, not to be uniformed, to increase the communication paths (e.g., direct connection between the network relay device 121*d* and 121*c*), deploying the controller function 160*c* in the I/O control device 123*c* itself, and so on, to facilitate variance in a mitigated plan.

These mitigations may be presented in the order of having fewer additional units and additional cost. For example, changes in timeslots are presented in preference as compared with the addition of the communication path because it does not require the addition of equipment.

On the other hand, if there is a control device 120, a network relay device 121, and/or an I/O control device 123 considered to be a surplus when it is determined possible to continue in step S064, such surplus devices can be provided. An operator can remove them from the control system, then it is possible to reduce the cost of the control system.

Alternatively, the resource allocation planning unit 131 is exemplified to present not only to satisfy the constraints, but the limit performance in the plan. For example, although the satisfaction of the communication cycle 1 ms in FIGS. 15(*a*) to 15(*c*) was a constraint, it is exemplified to present a feasible shortest communication period. Similarly, the maximum redundancy of the functions and communication path may be also shown. Thus, an operator can improve the control performance of the control system by setting the presented maximum performance.

The constraints in the planning of resource allocation of the resource allocation planning unit 131 may be communication delay, communication throughput and communication cycle among functions, and, control period among sensors, controllers, and actuators, redundancy of the communication device or function, degree of concurrent execution of the functions or communication device, the time difference of the communication timing among redundant functions, location of physical devices such as sensors and actuators, and so on depending on the desired implementation. In an example implementation, the requirements of the distributed functions can involve a time difference of a transmission timing of a control command with the other distributed functions in a configuration wherein the distributed functions transmits the control command to the other distributed functions.

When the function is redundant, it includes whether redundancy is possible on the same communication device. This is, it should not be redundant on the same communication device to emphasize the reliability, but it is possible to be redundant on the same communication device when simply to improve the performance.

The degree of the redundancy of the communication path and/or functions is not limited to double redundancy; it can be triple or more depending on the desired implementation.

Example implementations described herein can involve a protocol to select a packet based on the redundancy of the communication path among the distributed functions, and one or more of communication path or redundant function when it receives a plurality of redundant packets. When the communication path and function is redundant, the packet representing the control command and the sensor information or the like, the selection at the receiving side may be either first-come-first-served basis, last-come-first-served basis. Alternatively, priority is set to the sender or communication path, etc. based on the computer performance or communication performance, and so on, then consuming packet may be selected based on the priority (e.g. selecting a high priority).

The selection method of received packets may be a requirement to be hold in the distributed function requirement storage unit 130.

Incidentally, the redundancy of the communication path or the function may be activated all the time, or the redundant system may be activated after a failure. If the redundant system is configured to be activated after failure, it may be one of hot standby (the redundant system is powered and its state is synchronized with the main system), warm standby (the redundant system is powered), and cold standby (the redundant system is not powered).

The constraint may not be a detailed requirement, but can also be determined from the type of communication protocol or application. For example, if the communication protocol is for the control communication, the value of communication delay and communication cycle is associated in advance. It is possible to set the parameters as their requirements. For example, the performance value of real-time Ethernet standards are defined in IEC 61784 as the parameter index, it is exemplified that the minimum or maximum values of the parameter index can be used as a constraint condition. In other examples, the constraint condition as the redundancy of the communication path is 2 if the HSR or PRP defined IEC 62439-3 is used.

Incidentally, by using constraints and requirements of the control system as the input information, the configuration and/or structure of the control system that satisfies them may be presented. The information to be presented as the configuration and/or structure of the control system may include the number of control devices 120, network relay devices 121, and I/O control devices 123, the topology and configuration of the control network 122 for connecting the communication devices, transmission timing of the control device 120, the I/O control device 123, allocation of network resources such as timeslots in the network relay device 121, and so on.

Further, if the constraints include redundancy of the function, the resource allocation planning unit 131 holds an instance of the function and the resource allocation planning unit 131 can replicate the instance if needed. Another example can involve placing the replicated instance to target communication devices, so that redundant functions of the distributed functions can be deployed one or more of the plurality of communications devices.

Further, the control device 120, the network relay device 121, and the I/O control device 123 may have a setting means for external device (e.g., network planning apparatus 125) to be set the transmission timing and time slot, and deployment of the functions.

Depending on the desired implementation for target network resources in the resource allocation planning unit 131, the communication bandwidth, priority allocation in IEEE802.1Q, channel or the number of used channels of the radio frequency band can also be utilized.

In another example, the number of used routes in the route control of packets using a plurality of routes can be the number of replicated packets even if one communication path is used.

Alternatively, as a network resource, the data size per single or multiple datagrams or the number of datagrams constituting an IEEE 802.3 frame. In the network relay devices 121 of FIGS. 15(a) to 15(c), allocating the time slot was planned as the resource, but if EtherCAT is used as a portion of the control network 122, the data content (i.e. an EtherCAT datagram) received from a plurality of communication devices can be merged to a single IEEE 802.3 frame.

Depending on the desired implementation, allocation of the network resources may not necessarily be continuous. For example, when changing the number of timeslots in the time division communication, the time slot to be added may not be continuous.

Further, the period of maintaining the plan of the network resources may be effective only for a predetermined period, or until a predetermined time. A predetermined period may be set for a period from the instruction to change, or it may be specified a predetermined time period (e.g., such as from 18:00 to 24:00 during the daytime).

For example, in production systems in factories, FA (Factory Automation) system, PA (Process Automation) system, in the case where the production amount during the night is small, the plan may be changed during the night. In such a case, the resource allocation planning unit 131 in collaboration with SCADA, DCS, or MES (Manufacturing Execution System), an example implementation can involve obtaining information of the target control system from the collaborated system.

In the case of using the heartbeat (survival monitoring) information in order to detect the abnormality of the communication device and communication path, an example implementation for the planning can include the resource allocation for the heartbeat.

Further, in example implementations in which an abnormality occurs in the communication device and the communication path, resource allocation can be planned for backup use and the redundant functions of the distributed functions can be deployed at the time of failure or abnormality depending on the desired implementation. For example, in FIG. 15(a), in preparation for failure of the controller function, an example implementation can involve the controller function 160e being deployed in the I/O control device 123b and activated at the time of failure detection. In the time slot allocation of the network relay device 121, for example, an example implementation can involve reserving the vacant time slots in FIG. 15(c) preliminarily. In this case because of the preliminary setting, some of the constraints (e.g., redundancy of the communication path and communication cycle) are allowed to be planned even if they are not satisfied. In addition, depending on the desired implementation, a mitigated plan can be generated based on the plan to include some variance in the requirements so that the mitigated plan can be utilized even if the constraints are not completely satisfied. The variance in the requirements can be set in accordance with the desired implementation.

It is also possible to perform a backup plan when a state of the communication devices changes in accordance with the desired implementation, such as changing or adding a communication device newly, and not only in the event of failure of a communication device or a communication path.

Alternatively, the remaining resources and communication devices after deploying functions and resource allocation may be assigned for backup use in the form of a backup plan that is deployed when a state of the communication devices changes. Or the lowest priority function, resource (e.g. information processing function) may be assigned for backup use, depending on the desired implementation.

Incidentally, a plurality of network planning apparatuses 125 can deployed in the control system so that the redundancy of the apparatuses can be facilitated. Redundant network planning apparatus 125 is usually set on standby, and can be activated when the main network planning apparatus 125 becomes abnormal. Or both of the network planning apparatuses 125 may be activated at all times, depending on the desired implementation. In the case of activation of both of the network planning apparatus 125, communication devices for receiving the plan may prioritize the plan from the main network planning apparatus 125, or the last plan received.

The network planning apparatus 125 is not only for the planning of resource allocation, but also can be configured to generate or execute a simulation model for executing the output plan. Through generating a model for a given network simulator, an operator can examine the plan by executing the simulation model before actual system operation. This allows pre-validation or engineering of the configuration of control systems and examination of performance improvement. Further, erroneous settings during the actual operation can be identified by comparing the simulation. Thus, it is possible to improve the reliability, to shorten system preparation time of the control system, and to reduce system construction cost.

In the generation of simulation model, one or more scenarios simulating a failure of the communication path or communication device may be generated. In addition, when a failure of the control system occurs during operation, the cause and location of the failure may be estimated and presented to operator by comparing various indicators between the operation and simulation scenarios simulating failures. To facilitate such failure analysis, example implementations can be configured to measure the various indicators in the operating control system and simulation scenarios. Such indicators may be communication delay, synchronization accuracy between communication devices, which communication path is used for packet communication, which route is used in redundant communication, which function transmit a packet in functions to be configured as redundant, communication throughput between functions, and so on depending on the desired implementation.

Alternatively, when arranging a plurality of network planning apparatus 125, the area of the control system where each of the network planning apparatus 125 is responsible for planning is determined, the network planning apparatus 125 may be planned resource allocation within the area. In this case, it is possible to define the hierarchical relationship among the network planning apparatus 125, and they can plan the resource allocation in a hierarchical manner.

Through the example implementations described herein, according to the requirements and the constraints of the distributed functions constituting a control system, the allocation of functions and network resources can be planned easily, and the control system can be activated. The control system can be highly reliable by including redundancy of the functions and communication paths in the constraints. It is possible to facilitate higher reliability by making a backup plan assuming an abnormality of the communication device and communication path.

In addition, by adjusting the transmission timing of the control command of the controller function, it is possible to achieve higher performance exceeding feasible performance by a single controller function, thus it is possible to improve the performance of the control system. Further, by planning the resource allocation in case of addition, removal, and change of communication devices, it is possible to improve the maintainability of the control system. In addition, when the resource allocation is not possible, by presenting mitigation measures of the constraint and simulation support, it is possible to increase the feasibility of the control system. Similarly, by presenting unnecessary communication devices and resources, an operator can build the control system at a low cost by removing the communication devices and resources. In addition, the control performance of the control system can be improved by setting the maximum performance presented by the invention.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A planning node configured to deploy distributed functions to a distributed control system comprising a network and a plurality of communication devices facilitating an Internet of Things (IoT) system involving servers and edge computers, the distributed functions involving one or more of artificial intelligence (AI) functions or control functions facilitating the IoT system, the planning node comprising:
a processor, configured to:
gather requirements of the distributed functions constituting the distributed control system, information of the network, and information of the plurality of communication devices; and
generate a plan for deployment of the distributed functions to corresponding ones of the plurality of communications devices and allocation of network resources to the corresponding ones of the plurality of communication devices based on the gathered requirements and the information of the network.

2. The planning node of claim 1, wherein the processor is configured to generate the plan for deployment of the distributed functions to the corresponding ones of the plurality of communications devices and the allocation of network resources to the corresponding ones of the plurality of communication devices based on the gathered requirements and the information of the network by using a combination optimization process to determine communication path, transmit timing, and time slots for transmission.

3. The planning node of claim 1, wherein the requirements of the distributed functions comprises one or more of: communication delay, communication cycle, control period, communication throughput, redundancy of the communication path among the distributed functions, and redundancy of the function.

4. The planning node of claim 1, wherein the requirements of the distributed functions are a time difference of a transmission timing of a control command with other ones of the distributed functions in a configuration wherein the distributed functions transmits the control command to the other ones of the distributed functions.

5. The planning node of claim 1, wherein the requirements of the distributed functions comprises a protocol to select a packet based on the redundancy of the communication path among the distributed functions, and one or more of communication path or redundant function when it receives a plurality of redundant packets.

6. The planning node of claim 1, wherein the processor is configured to receive input of the requirements.

7. The planning node of claim 6, wherein the processor is configured to receive input of the requirements through collecting the requirements from the plurality of communication devices.

8. The planning node of claim 7, wherein the information of the network comprises a communication topology of the network, wherein the information of the plurality of communication devices comprises computing performance of the plurality of communication devices.

9. The planning node of claim 1, wherein the network resources comprises one or more of a communication timing of the communication device, a time slot to allow communication of only a predetermined packet, and a communication path.

10. The planning node of claim 1, wherein the processor is configured to deploy redundant functions of the distributed functions on the corresponding ones of the plurality of communications devices.

11. The planning node of claim 10, wherein the processor is configured to deploy the redundant functions of the distributed functions on the second planned communication device at the time of failure on the network or the first planned communication device.

12. The planning node of claim 1, wherein the processor is configured to generate the plan for deployment of the distributed functions to the corresponding ones of the plurality of communications devices and the allocation of network resources to the corresponding ones of the plurality of communication devices based on the gathered requirements and the information of the network as a backup plan that is deployed when a state of the communication devices changes.

13. The planning node of claim 1, wherein the processor is configured to output a mitigated plan of the generated plan which comprises variance of the requirements of the generated plan.

14. The planning node of claim 1, wherein the processor is configured to output simulation models simulating the plan and performance indicators.

15. The planning node of claim 14, wherein the processor is configured to output the simulations models simulating failure of the network or the corresponding ones of the plurality of communication devices.

16. The planning node of claim 15, wherein the processor is configured to present location candidates or a cause of a failure by comparing the performance indicators of the simulation model and the distributed control system.

\* \* \* \* \*